Jan. 6, 1953 A. P. ST. AUBIN 2,624,397
COMBINED HEADREST AND BACK REST
Filed Jan. 10, 1951 2 SHEETS—SHEET 2
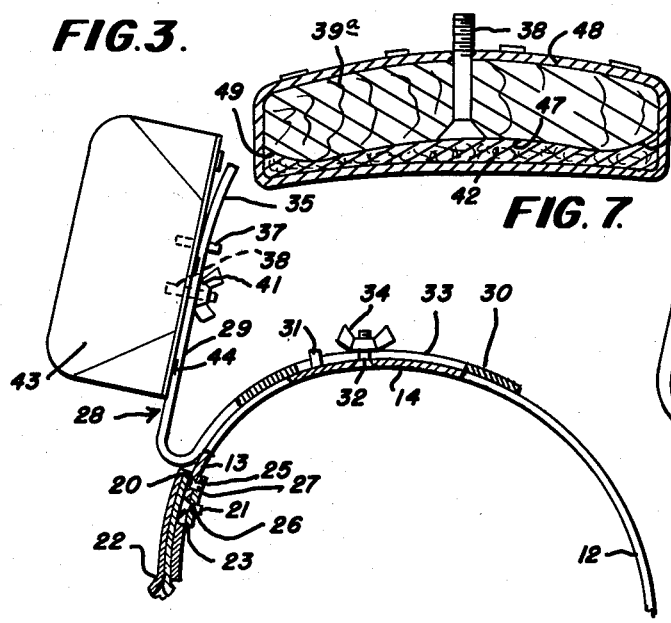
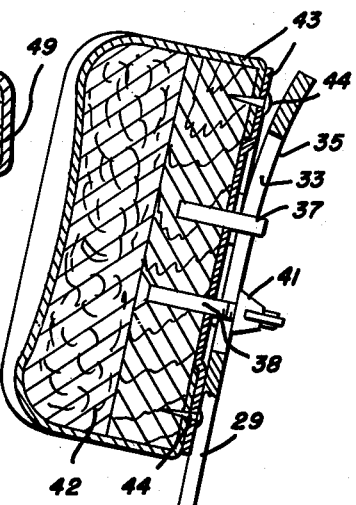
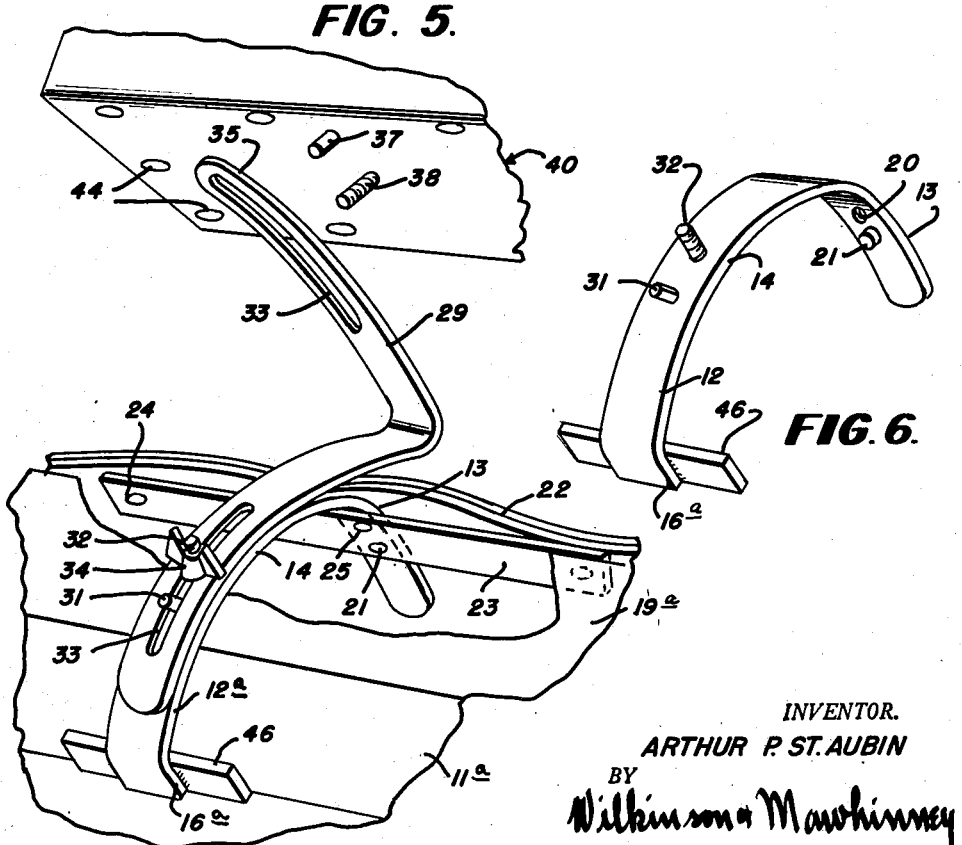
INVENTOR.
ARTHUR P. ST. AUBIN
BY
Wilkinson & Mawhinney
ATTORNEYS Patented Jan. 6, 1953

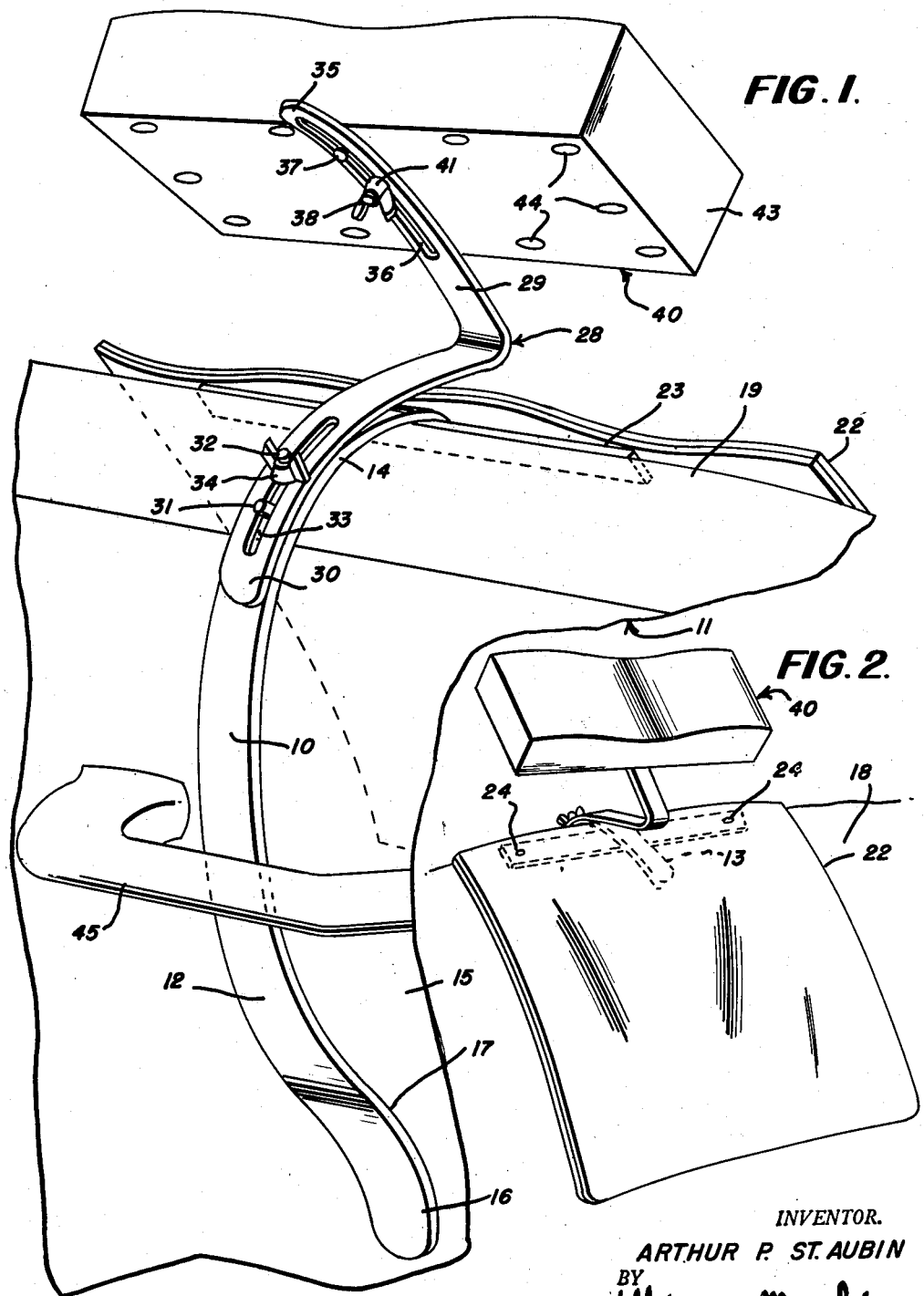

2,624,397

UNITED STATES PATENT OFFICE 2,624,397

COMBINED HEADREST AND BACK REST

Arthur P. St. Aubin, Yakima, Wash.

Application January 10, 1951, Serial No. 205,308

6 Claims. (Cl. 155—174)

The present invention relates to improvements in a combined headrest and backrest and has for an object the provision of a device of this kind which can be quickly and easily slipped over and removed from the back of a seat or the like, such as the seat of an automobile.

Another object of the present invention is to provide an improved structure in which the headrest can be adjusted vertically with respect to the seat and its back and can also be adjusted so that the head engaging surface of the headrest can be angularly adjusted with respect to a vertical plane. Separate means are also incorporated into the device for effecting a compound adjusting movement of the headrest by which the headrest can be vertically and horizontally adjusted and at the same time the angle at which the head engaging surface of the headrest is disposed with respect to a vertical plane can be changed.

A further object of the present invention is to provide an improved device of this character in which, during the use thereof, the user will aid in retaining the device in proper position without requiring any effort on the part of the user.

A still further object of the present invention is to provide an improved head and backrest which is adapted to be mounted on both the front and back seat with equal facility.

The present invention aims to provide an improved device of this type which permits of adjustment of the headrest without the necessity of removing the device from the back of the seat.

A further aim of the present invention is to provide an improved head and backrest which comprises relatively few parts, is easy to set up and inexpensive to manufacture.

With the foregoing and other objects in view, the invention will be hereinafter more fully described and more particularly pointed out in the appended claims.

In the drawings, in which the same parts are denoted by the same reference numerals throughout the several views, Figure 1 is a rear perspective view of the improved device constructed in accordance with the present invention and illustrated as applied to the back of the front seat of an automobile, Figure 2 is a front perspective view of the same, Figure 3 is a fragmentary side elevational view of the same with parts in section, Figure 4 is a vertical cross-sectional view of the headrest and showing a portion of the headrest supporting bracket, Figure 5 is a fragmentary partly disassembled rear perspective view of the improved device illustrated as applied to the back of the rear seat of an automobile, Figure 6 is a rear perspective view of the seat back engaging clamp shown in Figure 5, and Figure 7 is a horizontal longitudinal sectional view of modified form of headrest.

Referring more particularly to the drawings, 10 generally indicates a mounting member for engaging over the back 11 of a seat, such as the front seat of an automobile. The member 10 may be made of one piece of metal or other suitable material and comprises a back strap 12, a front strap 13 and a top piece 14 which connects the front and back straps.

The back strap 12 extends downwardly from the rear end of the top piece 14 substantially parallel to and spaced from the rear face 15 of the back 11 of the vehicle seat. The lower free end portion of the back strap 12, as illustrated, curves rearwardly away from the rear face 15 of the seat back as indicated at 16 to provide a heel 17 but it may curve forwardly towards the rear face of the seat back to form the heel. The heel 17 will engage the rear face 15 of the back 11 when the member 10 is positioned upon the back 11 of the seat.

The front strap 13 is shorter than the back strap 12 and extends downwardly from the forward end of the top piece 14 and curves slightly forwardly. The top piece 14 is longitudinally arcuate and rests upon the upper edge 19 of the back 11. Adjacent its upper end portion the front strap has a screw threaded opening 20 and a rearwardly projecting centering stud 21 just below the opening 20.

A backrest 22 comprising a cover of leather, plastic or the like, and a filler, such as kapok, hair or the like is detachably mounted on the front strap 13. An attaching strip 23 of metal or other appropriate material is secured at its end portions to the rear face of the backrest 22 adjacent its upper edge by rivets 24 or the like. The intermediate portion of the strip 23 is free of the backrest 22 and has a pair of vertically spaced apart openings 25 and 26 therein.

The opening 25 which is uppermost is larger than the opening 26 and registers with the threaded opening 20 in the front strap 13 when the front strap is positioned between the backrest 22 and the strip 23. When the openings 20 and 25 are in registry the stud 21 is received by the opening 26 of the strip 23. A screw 27 extends through the opening 25 of the strip 23 and is threadedly received by the threaded opening 20 of the front strap 13. The opening 25 is countersunk so that the head of the screw 27 is flush with the rear face of the strip 23 to prevent damage to the upholstery of the back 11.

A headrest supporting member or bracket generally indicated at 28 is adjustably mounted on the member 10 and is substantially V-shaped having a front leg 29 and a rear leg 30. The rear leg 30 is of substantially the same length and curvature as the top piece 14 of the member 10 and is superimposed thereon. The rear leg 30 can be slid upon the top piece 14 for adjusting the front leg 29 with respect to the seat of the vehicle and the back 11 of the seat. For permitting this sliding adjustment of the leg 30 and clamping it in the desired adjusted position, the top piece has an upstanding guide pin 31 and an upstanding threaded bolt 32 mounted thereon. The guide pin 31 and the bolt 32 are disposed in horizontal alignment and are fixed to the top piece 14 in any suitable manner.

The rear leg 30 has an elongated slot 33 therein in which the guide pin 31 and the bolt 32 are received for sliding movement while the bracket 28 is being adjusted. The guide pin 31 has a diameter substantially equal to the width of the slot 33 of the leg 30 so that the guide pin 31 will confine the movement of the leg to a substantially straight path while it is being adjusted. A wing nut 34 is threadedly received by the bolt 32 for clamping the leg 30 in adjusted position.

The front leg 29 of the bracket 28 extends upwardly from the forward end of the rear leg 30 at an angle of the order of forty-five degrees thereto. The leg 29 is substantially straight throughout the major portion of its length and its upper end portion is curved rearwardly as indicated at 35. The leg 29 has an elongated slot 36 therein for receiving a guide pin 37 and a screw threaded bolt 38 which are carried by the base 39 of a headrest generally indicated at 40. The headrest 40 may have sliding adjustable movement with respect to the leg 29 and the pin 37 and bolt 38 will guide the headrest in a substantially straight path during its sliding movement. A wing nut 41 is threadedly received by the bolt 38 for clamping the headrest in its adjusted position.

The base 39 of the headrest 40 may be made of wood, metal or other suitable material and the filler 42 may be kapok, hair or other appropriate material and is held in position against the base by a cover 43 of leather, plastic or other suitable material. The cover 43 may be held in place by upholstery finish tacks 44 which are driven through the cover into the rear face of the base 39. The front face of the base 39 may be longitudinally curved so that the central portion of the head engaging surface of the headrest will be depressed, whereby the head of the user will be more comfortably accommodated and escaping of the head in a lateral direction from the headrest while the user is asleep will be prevented.

In the use of the device, the straps 12 and 13 of the member 10 will be slipped down over the upper portion of the back 11 of the seat so that the back strap 12 and the front strap 13 will overlie the rear face 15 and the front face 18 of the back 11, respectively. The back strap may be positioned under the laprobe rail 45 of the vehicle.

The backrest 22 will depend from the front strap 13 and overlie a portion of the front face 18 of the back 11. The backrest will also overlie the front strap to prevent the front strap from contacting the back and shoulders of the user and thus avoid any discomfort to the user. The back and shoulders of the user will rest upon the backrest to increase the ease and comfort of the user and at the same time to aid in maintaining the device in the proper position.

The vertical distance of the headrest 40 from the seat of the vehicle may be varied by sliding the headrest up or down on the straight portion of the front leg 29 of the bracket 28. If it is also desired to change the angle of inclination of the headrest with respect to the back 11 and the vertical distance as well as the vertical position of the headrest, the headrest may be slid upwardly on the upper curved portion 35 of the front leg 29. When the desired position of the headrest has been obtained the wing nut 41 will be tightened. In order to move the headrest to a new position the wing nut 41 will be loosened but need not be entirely removed from the bolt 38 so that the wing nut will retain the guide pin 37 and the bolt 38 within the slot 36 for guiding the headrest in its movements.

Independent and additional vertical and angular adjustment of the headrest may be attained by loosening the wing nut 34 and sliding the leg 30 forward or backward upon the top piece 14 of the clamp. Due to the arcuate shape of the top piece 14 of the member 10 and the rear leg 30 of the bracket 28 such movement of the bracket 28 will effect a change in the vertical position of the headrest with respect to the seat and also a change in the angle at which the headrest is disposed with respect to the vertical and the back 11. The movement of the leg 30 on the top piece 14 also causes the headrest to move horizontally towards and from the back 11 of the seat. It will be noted that the movement of the leg 30 on the top piece 14 effects a three-fold adjustment of the headrest, namely, vertical angular and horizontal.

The device may be quickly and easily removed from the back 11 of the seat when desired by grasping the top piece 14 and exerting an upward pull thereon.

The device described above is especially adapted for application to the front seat of an automobile or the like: whereas the form of the invention illustrated in Figures 5 and 6 of the drawings is particularly applicable to the back seat of an automobile. The device shown in Figures 5 and 6 is identical to that of Figures 1 through 4 of the drawings except that the back strap 12a of the clamp is shorter than the back strap 12 having a length substantially equal to the height of the back 11a of the back seat of the vehicle. The lower end portion of the back strap 12a is bent forwardly as at 16a and has secured by welding or the like to its forward face a crosspiece or foot 46. The forward face of the foot 46 may be covered with rubber or other suitable material to prevent damage to the rear face of the back 11a of the vehicle seat.

The operation of this form of the invention is similar to that of the form shown in Figures 1 through 4 of the drawings.

In Figure 7 is illustrated another form of headrest in which the base 39a has both its front and back faces 47 and 48 longitudinally curved. The opposite end portions of the front face 47 are rounded off as at 49 so that the filler material 42a overlies and pads the corners of the base 39a to present a soft surface for engaging the head of the user.

The headrest may be about eight inches in length and four inches in width or any other desirable size. The backrest 22 may be eleven inches square or any other suitable size and shape.

The device may be used in connection with the backs of vehicle seats, chairs, sofas and the like.

It is obvious that various changes and modifications may be made in the details of construction and design of the above specifically described embodiment of this invention without departing from the spirit thereof, such changes and modifications being restricted only by the scope of the following claims.

What I claim is:

1. An improved headrest and backrest comprising a mounting member for positioning on the back of a seat and having a portion engaging the front face of the back of the seat, a headrest on said member, a backrest adapted to overlie a portion of the front face of the back of the seat, a strip secured to the rear face of said backrest and having a portion free of said backrest, said portion of the mounting member being positioned between the free portion of said strip and said backrest, said portions having openings therein adapted to register when said portion of the mounting member is positioned between the free portion of the strip and the backrest, the opening in said portion of the mounting member being screw threaded, a screw extending through the opening in said strip and being received by the opening in said mounting member, said strip having a second opening, and a centering stud on said mounting member adapted to be received by said second opening.

2. An improved headrest comprising a mounting member for positioning on the back of a seat, a supporting member on said mounting member and having a substantially straight portion and a curved portion, said portions having a slot therein, a headrest slidably mounted on said straight and curved portions of said supporting member, a threaded element on said headrest and extending through said slot, and a clamping element threadedly received by said element for holding said headrest in its adjusted position.

3. An improved headrest comprising a mounting member for positioning on the back of a seat and comprising a front strap, a back strap and a top piece connecting said front and back straps, said straps adapted to overlie the front and rear faces of the back of the seat when the top piece rests upon the upper edge of the back of the seat, said top piece being longitudinally curved, a substantially V-shaped bracket having a front leg and a rear leg, a headrest on said front leg, said rear leg having a longitudinal curvature conforming to the curvature of the top piece of the clamp and adapted to have longitudinal sliding adjustment thereon, said rear leg having an elongated slot therein, a guide pin on said top piece riding in said slot, a threaded element on said top piece and extending through said slot, and a nut received by said element for clamping the rear leg in its adjusted position.

4. An improved headrest as claimed in claim 3 characterized by the fact that said front leg of said bracket is provided with a substantially straight portion and a curved portion, that said portions of the front leg are provided with an elongated slot, that a guide pin is provided on said headrest for riding in the slot of said front leg, that a threaded bolt is provided on said headrest and extends through the slot in the front leg, and that a nut is provided on said bolt for holding said bolt and headrest in adjusted position in the slot of the front leg.

5. An improved headrest as claimed in claim 3 characterized by the fact that the lower end portion of said back strap is curved to provide a heel for engaging the rear face of the back of the seat when the top piece rests upon the upper edge of the back of the seat.

6. An improved headrest as claimed in claim 3 characterized by the fact that said back strap is relatively short to fit the back of the rear seat of an automobile or the like, that the lower end portion of the back strap is bent forwardly, and that a cross-piece is secured to the bent portion of the back strap for engaging the rear face of the back of the seat.

ARTHUR P. ST. AUBIN.

REFERENCES CITED

The following references are of record in the file of this patent:

UNITED STATES PATENTS

| Number | Name | Date |
| --- | --- | --- |
| 497,697 | Wasson | May 16, 1893 |
| 531,165 | Denio | Dec. 18, 1894 |
| 1,744,364 | Cruickshank | Jan. 21, 1930 |
| 2,555,814 | Pulsifer | June 5, 1951 |
| 2,560,925 | Brown | July 17, 1951 |